United States Patent [19]

Amjad et al.

[11] Patent Number: 4,952,327
[45] Date of Patent: * Aug. 28, 1990

[54] SCALE CONTROL WITH TERPOLYMERS CONTAINING STYRENE SULFONIC ACID

[75] Inventors: Zahid Amjad, Avon Lake; William F. Masler, Hinckley, both of Ohio

[73] Assignee: The B. F. Goodrich Company, Akron, Ohio

[ * ] Notice: The portion of the term of this patent subsequent to Dec. 5, 2006 has been disclaimed.

[21] Appl. No.: 235,270

[22] Filed: Aug. 23, 1988

Related U.S. Application Data

[63] Continuation-in-part of Ser. No. 939,333, Dec. 8, 1986, abandoned.

[51] Int. Cl.$^5$ .................................................. C02F 5/12
[52] U.S. Cl. ..................................... 210/701; 252/180
[58] Field of Search ............................ 210/698–701; 252/180, 181

[56] References Cited

U.S. PATENT DOCUMENTS

| | | | |
|---|---|---|---|
| 3,682,224 | 8/1972 | Bleyle | 210/701 |
| 3,709,815 | 1/1973 | Boothe et al. | 210/701 |
| 3,709,816 | 1/1973 | Walker et al. | 210/701 |
| 3,790,610 | 2/1974 | Lum et al. | 210/701 |
| 3,806,367 | 4/1974 | Lange et al. | 210/701 |
| 3,898,037 | 8/1975 | Lange et al. | 210/701 |
| 3,928,196 | 12/1975 | Persinski et al. | 210/701 |
| 4,425,326 | 1/1984 | Guillon et al. | 424/61 |
| 4,500,693 | 2/1985 | Takehara et al. | 210/701 |
| 4,532,048 | 7/1985 | Amjad | 210/701 |
| 4,536,292 | 8/1985 | Matz | 210/701 |
| 4,552,665 | 11/1985 | Ralston et al. | 252/180 |
| 4,560,481 | 12/1985 | Hollander et al. | 252/180 |
| 4,566,973 | 1/1986 | Masler | 210/701 |
| 4,575,425 | 3/1986 | Boffardi et al. | 210/697 |
| 4,589,985 | 5/1986 | Yorke | 210/699 |
| 4,596,661 | 6/1986 | Gill et al. | 210/728 |
| 4,618,448 | 10/1986 | Cha et al. | 210/701 |
| 4,634,532 | 1/1987 | Logan et al. | 210/697 |
| 4,640,793 | 2/1987 | Persinski et al. | 252/180 |
| 4,711,725 | 12/1987 | Amick et al. | 210/701 |
| 4,784,774 | 11/1988 | Amjad et al. | 210/701 |

FOREIGN PATENT DOCUMENTS

| | | | |
|---|---|---|---|
| WO83/02607 | 8/1983 | PCT Int'l Appl. | 210/701 |
| 2082600 | 3/1982 | United Kingdom | 210/701 |

*Primary Examiner*—Peter Hruskoci
*Attorney, Agent, or Firm*—Nestor W. Shust; George A. Kap

[57] ABSTRACT

Inhibition of scale is obtained by adding to an aqueous medium 0.5 to 500 ppm of a copolymer containing at least one of each of the following three monomers:
(a) monounsaturated carboxylic acids as well as salts and anhydrides thereof, the acids containing 3 to 5 carbon atoms, such as acrylic acid, methacrylic acid, maleic acid or its anhydride;
(b) acrylamidoalkane sulfonic acids and salts thereof, such as 2-acrylamido-2-methylpropane sulfonic acid; and
(c) styrene sulfonic acid and its salts.

10 Claims, No Drawings

SCALE CONTROL WITH TERPOLYMERS CONTAINING STYRENE SULFONIC ACID

REFERENCE TO RELATED APPLICATION

This is a continuation-in-part of application Ser. No. 939,333 filed Dec. 8, 1986, and entitled "Scale Control With Copolymers Containing Acrylamidoalkane Sulfonic Acid".

BACKGROUND OF THE INVENTION

Most industrial waters contain alkaline earth and transition metal cations such as calcium, barium, iron, zinc, manganese, and magnesium, and several anions such as bicarbonate, carbonate, sulfate, phosphate, silicate, and fluoride. When combinations of these anions and cations are present in concentrations which exceed the solubility of their reaction products, precipitates form until these product solubility concentrations are no longer exceeded. For example, when the ionic product of calcium and carbonate exceeds the solubility of calcium carbonate, a solid phase of calcium carbonate will form.

Solubility product concentrations are exceeded for reasons such as partial evaporation of the water phase, change in pH, pressure or temperature, and the introduction of additional ions which form insoluble compounds with the ions already present in the solution.

As these reaction products precipitate on surfaces of the water-carrying system, they form scale or deposits. This accumulation prevents effective heat transfer, interferes with fluid flow, facilitates corrosive processes, and harbors bacteria. This scale is an expensive problem in many industrial water systems, such as recirculating cooling water systems in cooling towers, in that the scale causes delays and shutdowns for cleaning and removal of the scale.

Citric acid, gluconic acid, and other materials have been used in the past to stabilize iron in solution and thus prevent its precipitation in forms such as ferric hydroxide and ferric oxide, wherein iron is in the third oxidation state. Citric acid and such materials effectively maintain iron in solution by forming complexes therewith which are soluble in water and thereby, remain dissolved in water. Although citric acid and cognate materials are effective as stabilizing agents for iron in solution, they are not antiscalants and are ineffective against scale such as calcium carbonate, calcium phosphate, and calcium sulfate.

In U.S. Pat. No. 3,928,196, a method is disclosed for inhibiting scale formation using two-component copolymers. The copolymers, which contain 5-50 mole percent acrylamidoalkane sulfonic acid and 95-50 mole percent of acrylic acid or a similar acid, have molecular weight of 1,000 to 10,000. The 25/75 mole percent copolymer of acrylamidomethylpropane sulfonic acid (AMPS) and acrylic acid (AA) is equivalent to 49/51 weight ratio whereas the 75/25 mole percent copolymer of AMPS and AA, is equivalent to 89.5/10.5 weight ratio.

The Amick U.S. Pat. No. 4,711,725 discloses stabilization of an aqueous system by inhibiting precipitation of scale with a copolymer antiscalant comprising 42 to 84% of (meth)acrylic acid and salts thereof, 11 to 40% acrylamidoalkane sulfonic acid, and 5 to 30% of one or more monomers selected from vinyl esters, vinyl acetate, and substituted acrylamide. The terpolymers of the Amick patent, when added to an aqueous system in a small amount, exhibit unexpectedly improved precipitation inhibition and dispersion performance for phosphates, iron, zinc, and inorganic particulates. The aqueous medium can contain or can be devoid of iron contamination.

U.S. Pat. No. 4,707,271 discloses the use of copolymers of acrylic acid and a substituted acrylamide as antiscalants in presence of soluble iron in solution. Up to about 30 weight parts, per 100 weight parts of all polymerized monomers, of other monomers can be polymerized with acrylic acid and substituted acrylamide.

This invention generally relates to inhibition of scale formation and deposition in aqueous systems. This is accomplished by adding to an aqueous system at least a threshold inhibition amount of a copolymer of at least three different monomers, i.e., monounsaturated carboxylic acid, salts and anhydrides thereof of 3 to 5 carbon atoms, an acrylamidoalkane sulfonic acid and salts thereof, and a styrene sulfonic acid. The resulting copolymer is soluble in water and is effective in inhibiting precipitation of scale, particularly calcium scale such as calcium phosphate, calcium sulfate, and calcium carbonate. Inhibition of scale precipitation is accomplished with the herein-defined copolymers which are effective against scale in the presence or the absence of soluble metal ions such as iron, manganese, and zinc. Soluble iron ions referred to herein exist in either the II or the III oxidation state.

Other related patent applications are concurrently filed for Messrs. Amjad and Masler including one entitled "Terpolymers For Dispersing Particulates In An Aqueous Medium" and another entitled "Stabilization of Metal Ions With Copolymers Containing Acrylamidoalkane Sulfonic Acid". All of these cases disclose the use of same or similar polymers.

SUMMARY OF THE INVENTION

This invention is directed to the inhibition of precipitation of scale-forming salts in an aqueous medium by addition thereto of an effective threshold inhibition amount of a copolymer which contains at least three different repeating groups. Such copolymers include polymerized monounsaturated carboxylic acid of 3 to 5 carbon atoms and salts thereof, polymerized acrylamidoalkane sulfonic acid, and a styrene sulfonic acid.

DETAILED DESCRIPTION OF THE INVENTION

Copolymers are described herein which are effective in reducing precipitation of scale-forming salts in aqueous media. Such salts include calcium phosphate, calcium sulfate, barium sulfate, magnesium hydroxide, strontium sulfate, and calcium carbonate, and particularly calcium salts such as calcium phosphate. Amount of such copolymer that is added to an aqueous medium is at least an effective threshold inhibition amount which is in the range of 0.5 to 500 parts per million (ppm) of the aqueous medium, preferably 1 to 50 ppm. Although the aqueous medium can be acidic, in a preferred embodiment, it is neutral or alkaline.

Specific applications contemplated for the copolymers disclosed herein include aqueous systems used in recirculating cooling towers, steam boilers, desalination, oil field applications in the secondary oil recovery operations, flash distillation, as well as in aqueous systems such as sugar solutions. The copolymers are effective in reducing precipitation of scale in the presence or the absence of soluble metal ions such as iron, manganese, zinc, and mixtures thereof and mixtures thereof with other metal ions.

The copolymers can be in unneutralized or neutralized form. Such copolymers can be neutralized with a strong alkali, such as sodium hydroxide, in which instance, the hydrogen of the carboxyl group in the copolymer is replaced with sodium. With the use of an amine neutralizing agent, the hydrogen will be replaced with an ammonium group. Useful copolymers for purposes herein include copolymers that are unneutralized, partially neutralized, and completely neutralized.

The copolymers are soluble in water up to at least about 20% solids concentration, and they must, of course, be soluble in water in amount used, to be effective antiscalants. The copolymers contemplated herein are polymers of at least three different monomers and include at least one monomer selected from each one of the following groups (a), (b), and (c):
(a) monounsaturated carboxylic acids of 3 to 5 carbon atoms, salts and anhydrides thereof;
(b) acrylamidoalkane sulfonic acids and salts thereof containing up to 6, preferably 1 to 4, carbon atoms in the alkane moiety; and
(c) a styrene sulfonic acid.

In addition to the above three requisite monomers, a small amount of other or secondary copolymerizable monomers can also be used as long as they do not substantially deleteriously affect performance of the copolymers as antiscalants. Amount of such secondary copolymerizable monomers can generally vary up to about 20% by weight, preferably up to about 10%, and more preferably 2 to 10% by weight of the final copolymer. Such secondary copolymerizable monomers exclude substituted acrylamides, vinyl esters and acrylate esters.

The copolymers suitable herein are random non-crosslinked polymers containing polymerized units of one or more of each of the monomers (a), (b), and (c), identified above, and can contain a small proportion of polymerized units of one or more of the secondary copolymerizable monomers. The copolymers have weight average molecular weight of 1,000 to 100,000, preferably 2,000 to 50,000, and more preferably 2,000 to 20,000. The molecular weight given herein is measured by gel permeation chromatography.

The antiscalant copolymers disclosed herein contain 20 to 95% by weight of the polymerized carboxylic acid or its salt or anhydride, preferably 40 to 90% and more preferably 50 to 70%; 1 to 60% by weight of the polymerized sulfonic acid or its salt, preferably 10 to 50%; 5 to 50% of a styrene sulfonic acid, preferably 5 to 40%; with up to about 20%, preferably up to 10%, of one or more of the secondary copolymerizable monomers which do not deleteriously affect performance of the copolymers as antiscalants. The data herein shows performance for terpolymers containing about 40 to 70% acrylic acid, about 10 to 50% acrylamido methylpropane sulfonic acid, and about 5 to 35% styrene sulfonic acid, with up to 15% of a secondary polymerizable comonomer.

The carboxylic acid monomers contemplated herein include monounsaturated monocarboxylic and dicarboxylic acids, salts and anhydrides thereof. Preferred in this class are monounsaturated monocarboxylic acids of 3 to 4 carbon atoms and water soluble salts thereof, particularly acrylic acid and methacrylic acid. Because of its availability, effectiveness and low price, acrylic acid is particularly preferred. Repeating units of acrylic acid, methacrylic acid, and salts thereof are represented as follows:

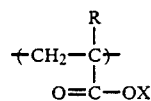

where R is hydrogen or methyl and X can be hydrogen, alkali metal, alkaline earth metal, or ammonium, particularly hydrogen, sodium, potassium, calcium, ammonium, and magnesium.

The repeating units of acrylamidoalkane sulfonic acids and salts thereof are defined as follows:

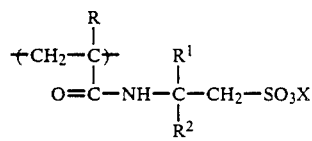

where R is hydrogen or methyl; X is hydrogen, ammonium, alkali metal or an alkaline earth metal, particularly hydrogen, ammonium or an alkali metal; and $R^1$ and $R^2$ are individually selected from hydrogen and alkyl groups of 1 to 4 carbon atoms. In a preferred embodiment, R is hydrogen and $R^1$ and $R^2$ are each an alkyl group of 1 to 3 carbon atoms. In this group of sulfonic acids, 2-acrylamido-2-methylpropane sulfonic acid or AMPS® is a commercial, readily available monomer which is especially preferred for the antiscalant effectiveness described herein.

Repeating units of styrene sulfonic acids and salts thereof are defined as follows:

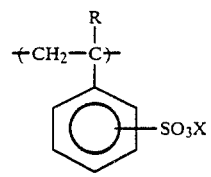

where R is hydrogen or a lower alkyl group of 1 to 6 carbon atoms, preferably hydrogen, and X is alkali metal or alkaline earth metal or ammonium, particularly hydrogen, ammonium or alkali metal. A particularly suitable sulfonic acid is styrene sulfonic acid where R is hydrogen and the —$SO_3X$ group is at the 3 or 4 position on the phenyl ring. The salts of styrene sulfonic acids are water-soluble. The sodium salt of styrene sulfonic acid is available commercially.

The monomers can be prepared, if desired, in a conventional manner but they are commercially available and therefore, can be purchased. Polymerization of the monomers results in an essentially non-crosslinked random copolymer, the molecular weight of which can be adjusted with a little trial and error. The copolymer is preferably formed in a high yield ranging from about 50% to about 99% by weight of the comonomers.

It is also a requirement that the copolymer be soluble in water. Typically, the copolymer is used in water in the range of 0.5 to 500 ppm. Thus, high solubility of water treatment compositions is not essential but desirable. The product is preferably shipped in drums as a concentrated aqueous solution containing in the range of about 20% to about 50% by weight of solids per 100 parts of solution, which requires solubility to the extent of at least 20 weight parts per 100 parts of water.

Polymerization of the monomers identified herein can be carried out in a mutual solvent for both, such as in a lower alkanol of about 1 to 6 carbon atoms, or in water, with an effective amount of a free radical initiator sufficient to produce the desired composition within an acceptable period of time. The monomeric acids can be used as such or can be in a partially or a completely neutralized form prior to polymerization.

The reaction is conveniently carried out in water as the only reaction medium at a temperature in the range of about 30° to about 130° C. usually at atmospheric or slightly elevated pressure. The concentration of the copolymer formed may range from about 5% to about 50% by weight, based on total solids, which solution can be shipped directly.

The copolymer may also be formed in an acyclic ketone, such as acetone, in an alkanol, in water, or mixtures thereof. If, for example, the copolymer is formed in an organic solvent, or a mixture of an organic solvent and water, the copolymer is converted from the organic solvent solution to a water solution. Typically, the organic solvent is stripped from the solution with steam or distilled off with subsequent additions of water and repetition of distillation to remove the solvent, followed by the addition of water and a neutralizing agent such as caustic solution, ammonia, a hydrazine, or a low-boiling primary, secondary or tertiary aliphatic amine.

The final aqueous solution of polymer salt is preferably in the range of about pH 2 to about pH 8, with a total solids content of about 5 to about 50% by weight of polymer in water.

The copolymers formed may have weight average molecular weight in the range of about 1,000 to about 100,000, preferably 2,000 to 50,000 and more preferably about 2,000 to about 20,000, as determined by gel permeation chromatography.

In a typical polymerization process, a glass lined or stainless steel reactor is charged with predetermined amounts of monomers along with solvent and a free radical polymerization catalyst under a nitrogen blanket, and the reaction mixture allowed to exotherm under controlled temperature conditions maintained by a heat-transfer fluid in the jacket of the reactor. The pressure under which the reaction occurs is not critical, it being convenient to carry it out under atmospheric pressure.

The copolymers described herein in connection with threshold inhibition of salt-forming scales can be used in combination with other conventional additives wherever appropriate. Examples of some of the conventional additions include anti-precipitating agents, oxygen scavengers, sequestering agents, corrosion inhibitors, antifoaming agents, and the like.

The copolymers formed in the manner described herein, were used to treat water which contained calcium ions and phosphate ions in a stirred pH-STAT test while maintaining constant pH and using an automatic tritrator to gauge the effectiveness of the polymer for inhibiting the formation and deposition of calcium phosphate. The test was carried out as follows: a known volume of a phosphate salt solution, such as $Na_2HPO_4$, or another soluble phosphate salt solution, was transferred to a known volume of distilled water in a double-walled glass cell to give a final concentration of about 9 ppm of orthophosphate ions. To this solution was added slowly and with continuous stirring a known volume of testing polymer solution sufficient to give a dosage of 10 ppm.

A pair of glass and reference electrodes, which were calibrated before and after each experiment with standard buffer solutions of pH 7.00 and 9.00, were then immersed in the solution which was maintained at 50° C. by circulating water through the outside of a glass cell jacket. After about 45 minutes, a known volume of calcium chloride solution was slowly added to the continuously stirred solution containing phosphate and polymer, to give a final calcium ion concentration of 140 ppm. The pH of the solution was then immediately brought to pH 8.50 by automatic addition of 0.10 M NaOH solution. The pH of the solution was then maintained at 8.50±0.01 throughout the experiment using the pH-stat technique. Solution samples were withdrawn after 22 hours, and analyzed, after filtration through 0.22 micrometer filter paper, for orthophosphate ions using the ascorbic acid method, as described in detail in "Standard Methods for the Examination of Water and Waste Water" 14th edition, prepared and published by American Health Association. The instrument used for the colorimetric measurements was a Beckman 5270 Spectrophotometer.

Tests for calcium sulfate and calcium carbonate were carried out by the method of Ralston, see J. Pet. Tech., Aug. 1969, 1029–1036.

The percent threshold inhibition (TI) attained for each experiment was obtained using the following formula, shown in this case for calcium phosphate:

$$\% \text{ TI} = \frac{(PO_4) \text{ exp} - (PO_4) \text{ final}}{(PO_4) \text{ initial} - (PO_4) \text{ final}} \times 100$$

where
($PO_4$) exp = concentration of phosphate ion in the filtrate in presence of the copolymer at time of 22 hours
($PO_4$) final = concentration of phosphate ion in filtrate in absence of the copolymer at time 22 hours
($PO_4$) initial = *concentration of phosphate ion at time zero.*

The invention disclosed herein is demonstrated by the following example which shows threshold inhibition tests thereof and other related polymers.

EXAMPLE 1

This example demonstrates threshold inhibition by various polymers, including the copolymers of this invention, of calcium phosphate scale. The tests were carried out in the manner described above for 22 or 24 hours to determine percent threshold inhibition of calcium phosphate and calcium sulfate, respectively, using the various polymers indicated below with approximate weight average molecular weight. Results of the tests are given below in Table I.

TABLE I

| Polymer Composition | Monomer Wt. Ratio | Mol. Wt. | % Ca/P[a] Inhibition | % CaSO$_4$[b] Inhibition |
|---|---|---|---|---|
| AA:AMPS: SSS | 70:10:20 | 5,000 | 81 | 99 |
| | 70:10:20 | 15,000 | 77 | — |
| | 60:10:30 | 5,000 | 93 | 97 |
| | 60:10:30 | 10,000 | 95 | 98 |
| | 60:10:30 | 15,000 | 89 | 99 |
| | 60:30:10 | 5,000 | 92(72) | 97 |
| | 60:30:10 | 15,000 | 99(79) | — |
| | 60:30:10 | 29,000 | 94(67) | — |
| | 60:30:10 | 33,000 | 86(71) | — |

TABLE I-continued

| Polymer Composition | Monomer Wt. Ratio | Mol. Wt. | % Ca/P[a] Inhibition | % CaSO$_4$[b] Inhibition |
|---|---|---|---|---|
| | 60:32.5:7.5 | 15,000 | 97 | 98 |
| | 50:30:20 | 5,000 | 92 | 94 |
| | 50:30:20 | 10,000 | 95 | — |
| | 50:30:20 | 15,000 | 96 | 97 |
| | 50:30:20 | 30,000 | 95 | — |
| | 40:30:30 | 5,000 | 66 | 96 |
| | 40:30:30 | 10,000 | 87 | 95 |
| | 40:30:30 | 15,000 | 95(85) | 92 |
| | 40:50:10 | 15,000 | 83 | 71 |
| | 50:30:20 | 60,000 | 86 | — |
| | 50:40:10 | 50,000 | 95 | — |
| AA:AMPS:SSS:DADMAC | 60:25:10:5 | 15,000 | 74 | — |

[a]conditions: calcium = 140 ppm; phosphate = 9 ppm; pH = 8.50; T = 50° C.; time = 22 hr.; polymer = 10 ppm
[b]conditions: calcium = 2000 ppm; sulfate = 4800 ppm; T = 66° C.; time = 24 hr.; polymer = 4 ppm The following contractions appear in the above table:
Ca/P—calcium phosphate
AA=acrylic acid
AMPS ®=2-acrylamido-2-methylpropane sulfonic acid
SSS=sodium styrene sulfonate
DMDMAC=diallyldimethylammonium chloride The numbers in parentheses indicate percent threshold inhibition of calcium phosphate in the presence of 1.0 ppm of soluble iron (III).

The sodium styrene sulfonate was commercial grade material obtained from two different sources and is believed to be primarily the p-isomer.

It has been shown that the copolymers disclosed herein are effective antiscalants in the presence or absence of soluble metal ions. Typical scales encompassed by the present invention include calcium scales such as calcium phosphate, calcium sulfate, and calcium carbonate.

The copolymers described herein can be used in aqueous recirculating systems where the copolymers are effective in reducing deposition of scale in the presence or the absence of soluble metals, such as iron. As an open recirculating cooling system is brought into operation, the concentration of scale-forming materials increases due to evaporation of some of the water. As the cycles of concentration increase, the scaling tendency of the system also increases. When an intolerable concentration of scale-forming ions is reached, additional copolymer may be added above the normal dosage. However, in preferred operation mode, the system is operated at a steady state. Make-up water is added to compensate for evaporation and other losses. A continuous or intermittent blowdown is used to remove some of the water containing high levels of scalants, and copolymer is added along with the make-up water to maintain the desired copolymer concentration in the system. In reverse osmosis systems, the system is operated at a steady state. The dosage of polymer in the feed is chosen such that it will prevent deposition of scale in the concentrated brine solution. With appropriate choice of polymer levels and operating conditions, a reverse osmosis system may be operated for a very substantial length of time before shutdown must occur to clean the membranes. In such reverse osmosis systems, amount of soluble metals, such as soluble iron, is on the order of up to about 10 ppm, preferably 1-5 ppm.

It has been shown that the terpolymers disclosed herein are effective scale inhibitors in the presence or absence of soluble metal ions. This is surprising since one would expect that such terpolymers would lose their effectiveness against scale in the presence of soluble metal ions.

We claim:

1. A method of inhibiting precipitation of scale, including calcium phosphate, in an aqueous medium, in the presence or in the absence of iron, comprising adding to said aqueous medium an effective amount of a water-soluble copolymer for the purpose of inhibiting precipitation of said scale, said copolymer consisting essentially of (a) 40 to 70% by weight carboxylic monomer selected from acrylic acid, methacrylic acid, salts of such acids, and mixtures thereof, (b) 10 to 50% by weight of a sulfonic monomer selected from 2-acrylamido-2-methylpropane sulfonic acid, 2-methacrylamido-2-methylpropane sulfonic acid, salts of said acids, and mixtures thereof, (c) 5 to 30% of a styrene sulfonic acid, and (d) up to 20% by weight of one or more secondary copolymerizable monomer which does not deleteriously affect performance of said copolymer as antiscalant, said secondary copolymerizable monomer excluding substituted acrylamides, vinyl esters, and vinyl acetate; said copolymer having a weight average molecular weight in the range of about 1,000 to 100,000.

2. Method of claim 1 wherein amount of said copolymer is 1 to 50 ppm and its molecular weight is in the range of about 2,000 to 50,000.

3. Method of claim 2 wherein amount of said secondary monomer is up to 10% by weight and molecular weight of said copolymer is 2,000 to 20,000.

4. Method of claim 3 wherein said aqueous medium is alkaline and is selected from process water used in steam generating systems, recirculating cooling water systems, gas scrubbing systems, desalination water systems, and crude petroleum recovery systems.

5. Method of claim 4 wherein in said copolymer, amount of said styrene sulfonic acid is about 5 to 30%.

6. Method of claim 1 wherein said copolymer has molecular weight of about 2,000 to 50,000 and is selected from the following copolymers, given in weight parts: (a) 40 to 70% acrylic acid, methacrylic acid, and mixtures thereof; (b) 10 to 50% acrylamido methylpropane sulfonic acid; (c) 5 to 30% styrene sulfonic acid; and (d) up to 15% of one or more other polymerizable monomers.

7. Method of claim 6 wherein said styrene sulfonic acids and salts thereof are defined as follows:

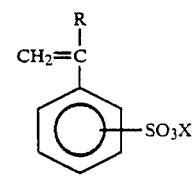

where R is selected from hydrogen and alkyl groups of to 6 carbon atoms, and X is selected from hydrogen, alkali metals, alkaline earth metals, ammonium groups, and mixtures thereof.

8. Method of claim 7 wherein in the formula, R is selected from hydrogen and alkyl groups of 1 to 2 carbon atoms and X is sodium.

9. Method of claim 7 wherein in the formula, R is hydrogen and the —SO$_3$X group is at the 3 or 4 position on the phenyl ring.

10. Method of claim 1 wherein said copolymer is selected from the following copolymers, given in weight parts:
   (a) 70/10/20 copolymer of AA/AMPS/SSS
   (b) 60/10/30 copolymer of AA/AMPS/SSS
   (c) 60/30/10 copolymer of AA/AMPS/SSS
   (d) 60/32.5/7.5 copolymer of AA/AMPS/SSS
   (e) 50/30/20 copolymer of AA/AMPS/SSS
   (f) 40/30/30 copolymer of AA/AMPS/SSS
   (g) 40/50/10 copolymer of AA/AMPS/SSS
   (h) 50/40/10 copolymer of AA/AMPS/SSS
   (i) 60/25/10/5 copolymer of AA/AMPS/SSS/-DADMAC wherein the contractions are defined as follows:
AA=acrylic acid
SSS=sodium styrene sulfonate
AMPS=2-acrylamido-2-methylpropane sulfonic acid
DADMAC=diallyldimethylammonium chloride.

* * * * *